United States Patent

[11] 3,586,145

| [72] | Inventors | Omar Leo Cunningham, Jr.<br>La Jolla;<br>Howard N. Saxton, El Cajon, both of, Calif. |
|---|---|---|
| [21] | Appl. No. | 853,785 |
| [22] | Filed | Aug. 28, 1969 |
| [45] | Patented | June 22, 1971 |
| [73] | Assignee | Stromberg Datagraphix, Inc.<br>San Diego, Calif. |

[54] ELECTROMAGNETIC CLUTCH HAVING STACKED ARMATURE DISKS
5 Claims, 3 Drawing Figs.

[52] U.S. Cl. .................................................. 192/84C
[51] Int. Cl. .................................................. F16d 27/10
[50] Field of Search .................................................. 192/84;
188/163

[56] References Cited
UNITED STATES PATENTS

| 2,344,111 | 3/1944 | Ryba | 192/84 (A) |
| 3,368,657 | 2/1968 | Wrensch et al. | 192/84 (C) |

*Primary Examiner*—Allan D. Herrmann
*Attorney*—John R. Duncan

ABSTRACT: A method to substantially eliminate audible noise in electromagnetic shaft coupling devices is disclosed which utilizes an armature assembly comprising a plurality of thin armature discs which lower the resonant frequency, provide frictional damping, and make the armature discs sufficiently flexible to conform to the mating surface.

PATENTED JUN22 1971 3,586,145

INVENTORS.
OMAR LEO CUNNINGHAM, JR.
HOWARD N. SAXTON
BY John R Duncan
ATTORNEY

ELECTROMAGNETIC CLUTCH HAVING STACKED ARMATURE DISKS

BACKGROUND OF THE INVENTION

This invention relates to electromagnetic shaft coupling devices which are often used as a means to transfer kinetic energy from one rotatable assembly to another rotatable or fixed assembly in the form of kinetic energy and/or heat. More particularly, this invention relates to magnetic clutches and brakes which produce undesirable audible noise during engagement and disengagement. The noise generated by the armature assembly clutch or brake is usually associated with the natural frequency of resonance of the armature assembly. The frequency of resonance is dependent upon the mass, geometry, and elasticity of the assembly. A previous method to reduce the inherent noise with such devices is described in U.S. Pat. No. 3,368,657, wherein a single-armature disc is cut perpendicularly to the plane of the armature disc in order to divide the armature disc in component parts or segments. Such a method changes the relative mass by an infinitesimal amount and the corresponding change in geometry is substantially the reason for the resultant change in resonant frequency of the armature disc. This technique has the intrinsic disadvantage of higher assemblage costs since each of the component parts or segments must be joined to a fastener or backplate.

Previous armatures known in the art usually necessitated a "wear-in" period during initial operation of an electromagnetic shaft coupling device. An extended "wear-in" period was usually required with solid disc armatures because the adjacent coupling surfaces were not perfectly flat and parallel. The amount of flexibility was limited in these solid armatures and did not allow for an effective contact with the mating surface after assemblage in an electromagnetic device. In order to provide a greater area of surface contact between the two coupling surfaces, additional assemblage operations and higher costs were demanded due to the initial extended "wear-in" period.

In view of the problems associated with audible noise, inflexibility, assemblage and cost, there is a need for an improved method to reduce armature noise in electromagnetic shaft coupling devices.

SUMMARY OF THE INVENTION

An object of this invention is to control and substantially eliminate the audible armature noise associated with electromagnetic shaft coupling devices during engagement and disengagement.

Another object of this invention is to provide a method to eliminate the necessity of an initial "Wear-in" of the armature after assemblage of electromagnetic shaft coupling devices in order to conform to the mating surface.

Another object is to provide an inexpensive method simple in construction which substantially eliminates audible noise from an armature assembly in an electromagnetic shaft coupling device.

The above objects, and others, are accomplished in accordance with this invention by providing an armature assembly comprising a plurality of thin armature discs secured against relative rotation on a shaft which is brought into engagement with a mating surface upon application of a magnetic field within an electromagnetic shaft coupling device. Such an assembly has a common axis and the armature discs are adjacent and substantially parallel to one another. This invention provides a unique armature assembly whereby the mass and geometry are such that the resonant frequency of the assembly is lowered. Furthermore, this invention teaches a method to provide an increased damping effect in an armature assembly. The flexibility of the armature assembly of this invention increases the portion of the mating surfaces in contact with each other, thus permitting the transmission of greater torque with a given magnetic field. Our teachings enable the substantial elimination of audible noise from an armature assembly.

DETAILED DESCRIPTION OF THE INVENTION

In the illustrated embodiment described below, either shaft 14 or 18 may be the driving shaft or it may be the driven shaft, depending upon the application desired. The illustrated embodiment indicates a clutch assembly with shafts 14 and 18 rotatable.

Figure 1:
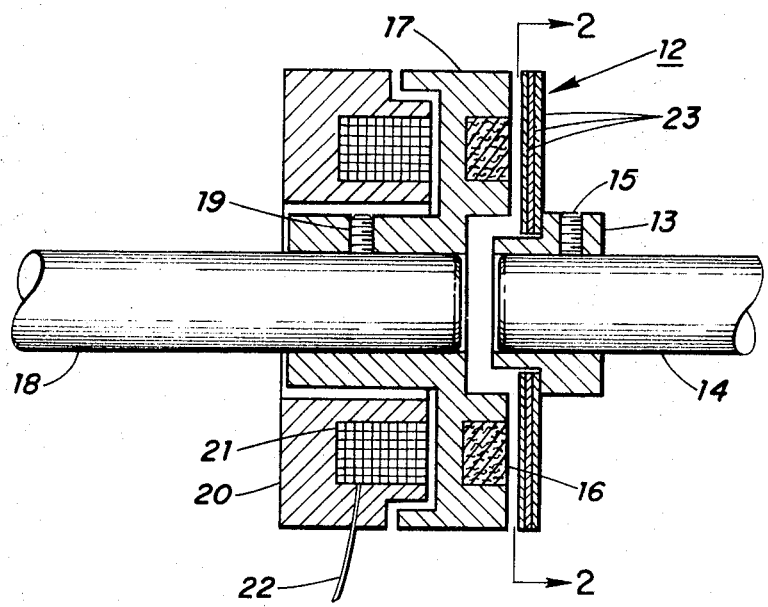
FIG. 1 illustrates an axial section through an electromagnetic shaft coupling device embodying the present invention.

Referring to FIG. 1, an axial section of an electromagnetic shaft coupling device is illustrated which may be enclosed in any convenient coupling housing (not shown). The armature discs 23 of the present invention are made of magnetic material and comprise armature assembly 12. The plurality of armature discs may be conveniently attached in any appropriate manner to a shaft 14, for example by splines, keys, or the like. In FIG. 1, three armature discs 23 are shown as being annular but other suitable shapes may be utilized, such as triangular, etc. The armature assembly 12 is shown axially slidable on armature hub 13 which is attached to rotatable shaft 14 by set screw 15. Annular friction material 16 is embedded in rotor 17 which is attached to shaft 18 by set screw 19. Rotor 17 is made of magnetic material. Shaft 18 and attached parts as illustrated in FIG. 1 are rotatable. Annular magnetic material 20 has a channel for a coil of wire 21 which produces a magnetic field upon application of a control signal at 22. When current flows through the coil 21, a magnetic field is produced such that armature assembly 12 is urged toward rotor 17 and friction material 16. As shown in FIG. 1, the three armature discs 23 which comprise armature assembly 12 slide axially along the armature hub 13 toward rotor 17 and friction material 16. As a result, shaft 14, is engaged with shaft 18, whereby the rotational energy of shaft 14 is substantially transferred to shaft 18.

Disengagement occurs when the current through the coil 21 is interrupted such that the force urging the armature assembly 12 toward rotor 17 and friction material 16 is discontinued. Disengagement allows shaft 14 to freely rotate without transferring any rotational energy to rotor 17 and friction material 16.

Figure 2:
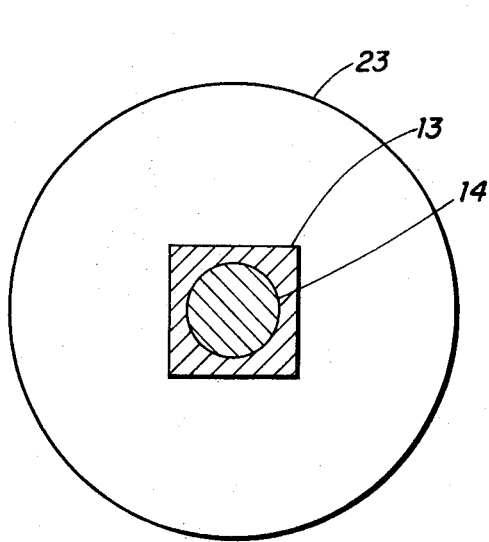
FIG. 2 shows a section taken along the line 2-2 in FIG. 1.

FIG. 2 shows a sectional view taken along the line 2-2 of FIG. 1. FIG. 2 illustrates an armature disc 23 with a square opening which is free to axially slide on the square outer surface of the armature hub 13. The armature hub 13 is attached to shaft 14 by set screw 15, as shown in FIG. 1. Upon the presence of a magnetic field, the array of magnetic armature discs 23 are thus able to be urged along armature hub 13 toward rotor 17 and friction material 16 (FIG. 1) and as such transfer the rotational energy of shaft 14 to the coupling surface of material 16.

Figure 3:
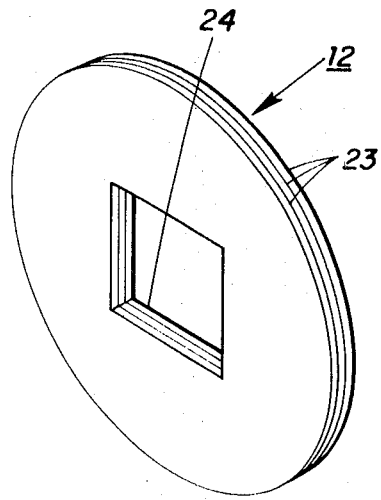
FIG. 3 illustrates, in a perspective view, an armature assembly embodying the present invention.

FIG. 3 illustrates an armature assembly 12 comprising three armature discs 23, each with a square hole 24. No fastening means or devices are required to secure the three armature discs 23 to each other as the square surface of hub 13 and the magnetic field of coil 21 adequately serve this purpose once the discs are assembled in a clutch and the coil is energized.

Previously the thickness of a solid disc armature was primarily determined by the torque transferred. The greater the thickness of the single armature, the greater the magnetic flux and the greater the force urging the two mating surface areas together. With any given coefficient of friction between the two surface areas the minimum thickness of a solid disc armature was determined by the torque to be transmitted.

The electromagnetic shaft coupling device in the illustrated embodiment was utilized as an electromagnetic clutch assembly. Three equally thin armature discs having a total thickness of 0.039 inch replaced a single thick armature disc of 0.070 inch. The flexibility of the thin armature discs provided a greater contact area between the mating surfaces during engagement over the conventional single thick armature disc. While a total armature assembly thickness between 0.039 inch and 0.070 inch produced less magnetic flux, the added flexibility of the thin armature discs sufficiently increased the effective contact area that the armature assembly transmitted as much torque as the 0.070 inch single thick armature disc. The reduced mass and changed armature geometry provided a reduction in the resonant frequency of the armature assembly. While three thin armatures were used in the illustrated embodiment, eight 0.005 inch thick armatures would also provide satisfactory results. A single 0.070 inch thick armature may be replaced by two 0.035 inch thick armatures to produce a substantial reduction in audible armature noise. Good results have been achieved using armatures comprised of a steel composition classified by the Society of Automotive Engineers as No. 1010 or by American Iron and Steel Institute as No. C 1010.

It is well known that "wear-in" of an armature assembly occurs during initial operation of an electromagnetic shaft coupling device. The flexibility of armature assemblies provided by the present invention allows for a greater area of initial surface contact between the mating surfaces and as such reduces the time required for the stable operation of these devices.

By dividing a single-thick armature disc into a number of thin armature discs, low magnetic reluctance may be maintained and flexibility increases such that the armature assembly is able to transfer the required rotational torque. If during engagement and disengagement armature vibrations result, each armature disc is able to slide against the adjacent armature disc and as such provides frictional damping. The combination of frictional damping and the altered resonant frequency of the armature assembly taught by the present invention substantially reduces audible armature noise during engagement and disengagement in electromagnetic shaft coupling devices. The resultant audible noise reduction diminishes the fatigue and annoyance of an operator of the assembly incorporating an electromagnetic shaft coupling device utilizing this invention.

Although specific components and operative sequences have been described in an illustrated embodiment, other suitable materials, components or sequences of operations may be used, where suitable, with similar results. Many modifications and ramifications of the present invention will now become apparent to those skilled in the art upon reading the present disclosure. These modifications and ramifications are intended to be included within the scope of this invention.

We claim:
1. An electromagnetic clutch assembly comprising:
   a. a rotatable shaft;
   b. an armature assembly consisting of from two to eight armature discs of magnetic material in a stacked, surface contact, arrangement;
   c. means for supporting said armature assembly on said shaft to allow sliding of said assembly along the axis of said shaft while substantially preventing movement around the axis of said shaft;
   d. a rotor assembly located adjacent to said armature assembly for coaxial rotation with said shaft; said rotor having a quantity of frictional material embedded in the surface thereof adjacent said armature assembly; and
   e. electromagnetic control means to slide said armature along said shaft into pressure engagement with said frictional material, whereby said armature assembly is coupled to said rotor for rotation therewith.
2. An electromagnetic clutch assembly as recited in claim 1 wherein said electromagnetic control means comprises:
   a coil of wire;
   b. means to control current flow through said coil of wire; and
   c. annular magnetic material with an annular channel for said coil of wire whereby a magnetic field is produced in said annular magnetic material when current flows through said coil of wire.
3. An electromagnetic clutch assembly as recited in claim 1 wherein said armature discs are each at least about 0.010 inch thick and not greater than about 0.070 inch thick.
4. An electromagnetic clutch assembly as recited in claim 1 wherein said armature discs are each about 0.015 inch thick and consisting essentially of steel C 1010.
5. An electromagnetic clutch assembly as recited in claim 1 wherein said armature assembly comprises two substantially annular armature discs and said discs each being about 0.015 inch thick.